(12) United States Patent
Keller et al.

(10) Patent No.: US 10,814,707 B2
(45) Date of Patent: Oct. 27, 2020

(54) WIND DEFLECTOR FOR OPEN ROOF CONSTRUCTION

(71) Applicant: Inalfa Roof Systems Group B.V., Oostrum (NL)

(72) Inventors: David Keller, Clarkston, MI (US); Ian Schornak, Oxford, MI (US)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 5 days.

(21) Appl. No.: 16/284,194

(22) Filed: Feb. 25, 2019

(65) Prior Publication Data

US 2019/0263237 A1 Aug. 29, 2019

(30) Foreign Application Priority Data

Feb. 28, 2018 (DE) .................... 20 2018 101 104 U (51) Int. Cl.
*B60J 7/22* (2006.01)
(52) U.S. Cl.
CPC ....................................... *B60J 7/22* (2013.01)
(58) Field of Classification Search
CPC ........................................................ B60J 7/22
USPC ......................................................... 296/217
See application file for complete search history.

(56) References Cited

U.S. PATENT DOCUMENTS

| 4,740,409 | A | * | 4/1988 | Lefkowitz | ............... B29C 48/08 428/131 |
| 9,394,012 | B2 | * | 7/2016 | Reuvekamp | ......... B62D 35/005 |
| 2008/0246306 | A1 | | 10/2008 | Oerke et al. | |
| 2009/0309393 | A1 | | 12/2009 | Pihale et al. | |
| 2014/0132026 | A1 | * | 5/2014 | Broeren | ................. B60J 1/2044 296/97.11 |

FOREIGN PATENT DOCUMENTS

| DE | 102005054186 A1 | 5/2007 |
| DE | 202006019899 U1 | 5/2007 |
| DE | 102006006553 B3 | 6/2007 |
| DE | 102006043275 B3 | 1/2008 |

OTHER PUBLICATIONS

German Search Report, dated Oct. 5, 2018 for corresponding German Patent Application No. 202018101104.9, filed Feb. 28, 2018.

* cited by examiner

*Primary Examiner* — Dennis H Pedder
(74) *Attorney, Agent, or Firm* — Steven M. Koehler; Westman, Champlin & Koehler, P.A.

(57) ABSTRACT

A wind deflector assembly for use in an open roof construction for a vehicle includes an upper elongate element which is movably connected to a stationary part and a flexible wind deflecting material that extends at least along the front of the roof opening, being attached at a lower end to the stationary part and at an upper end to the upper elongate element to keep the wind deflecting material taut in at least the effective position. The wind deflecting material is folded at the upper end in a folded part, said folded part having a hinge part and an opposite first outer end part and wherein the folded part is mounted inside a first cavity whereby the first outer end part is being supported on the upper surface of the protruding part in the first cavity at least when the wind deflector assembly is in an effective position.

20 Claims, 5 Drawing Sheets

WIND DEFLECTOR FOR OPEN ROOF CONSTRUCTION

BACKGROUND

The discussion below is merely provided for general background information and is not intended to be used as an aid in determining the scope of the claimed subject matter.

Aspects of the invention relate to a wind deflector assembly for use in an open roof construction for a vehicle having a roof opening in its fixed roof, comprising a stationary part, at least a closure means such as a panel supported by the stationary part and adapted to close the roof opening in the fixed roof and to selectively open it by being moved at least rearward. The wind deflector assembly is positioned near the front of the roof opening and is movable between an ineffective position below the fixed roof and an effective position projecting above the fixed roof. The wind deflector assembly includes an upper elongate element which is movably connected to the stationary part. A flexible wind deflecting material extends at least along the front of the roof opening, being attached at a lower end to the stationary part and at an upper end to the upper elongate element to keep the wind deflecting material taut in at least the effective position wherein the upper elongate element comprises at least a first cavity having an internally shaped protruding part having an upper surface.

Such a wind deflector assembly is known from CN20317240 U, in which a wind deflector is disclosed having a wind deflecting net, which is connected to an upper rod by means of a separate V shaped part being attached to the wind deflecting net. To manufacture such wind deflector net of the prior art involves a secure connection of the separate V shaped part which is a typical flexible part to an even more flexible semi permeable wind deflecting net. Manufacturing a reliable connection involves additional handlings of the materials and the end product. Also the inadequate fixing of the separate part may influence the shape of the wind deflector net in an effective position of the wind deflector whereby areas of the net which do not have the same tension may be not taut compared to neighboring areas of the net which are taut, which from an aesthetical point of view is undesirable.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A wind deflector assembly for use in an open roof construction for a vehicle having a roof opening in its fixed roof, includes a stationary part and at least a closure element such as a panel supported by the stationary part, which is configured to close the roof opening in the fixed roof and to selectively open it by being moved at least rearward. The wind deflector assembly is positioned near the front of the roof opening. The wind deflector assembly is movable between an ineffective position below the fixed roof and an effective position projecting above the fixed roof.

The wind deflector assembly includes an upper elongate element which is movably connected to the stationary part and a flexible wind deflecting material that extends at least along the front of the roof opening, being attached at a lower end to the stationary part and at an upper end to the upper elongate element to keep the wind deflecting material taut in at least the effective position. The upper elongate element comprises at least a first cavity having an internally shaped protruding part having an upper surface. The wind deflecting material is folded at the upper end in a folded part, said folded part having a hinge part and an opposite first outer end part. The folded part is mounted inside the first cavity whereby the first outer end part is being supported on the upper surface of the protruding part in the first cavity at least when the wind deflector assembly is in the effective position and wherein the folded part of wind deflecting material is reinforced by polyester material applied such that the polyester material encapsulates yarns of the wind deflecting material in the part which is reinforced. Such connection between wind deflecting material and upper elongate element is made by a folded part which is inherently part of the wind deflecting material itself. When manufacturing the wind deflecting net the shape of the net is cut out to the dimension of the appropriate design and in a next manufacturing step the upper part of the net is folded and polyester material in the form of a strip is pressed using heat into the folded part, such that the folded part is reinforced because the polyester material encapsulates the yarns of the fabric of the wind deflecting net.

According to one aspect of the invention, the folded part is reinforced by polyester material over a length X of the folded part measured from the first outer end part to the hinge part wherein the length X lies in the range of 50% to 100% of the length of the folded part. The reinforcement by the polyester material creates a stiff folded part that can take up part of the load induced by the tension in the wind deflecting net. Such tension is caused in static condition by stretching the wind deflecting net between the attachment at the lower end to the stationary part and the attachment at the upper end to the elongated member in the effective position of the elongated member. The elongated member is loaded by springs at each of the lateral ends of the wind deflector assembly. In dynamic conditions the load may be increased by the wind load that pushes the wind deflecting material to the rear.

In another embodiment the reinforcement with polyester material extends from the first outer end part of the folded part via the hinge part towards an area of the wind deflecting material which (in effective state of the wind deflector assembly) extends downwardly, over a length Y measured from the hinge part along the wind deflecting material in an opposite direction and wherein the length Y lies in the range of 0% to 100% of the length of the folded part. In this embodiment not only the folded part is reinforced but also the hinge itself and the upper part of the wind deflecting material near the hinge. This causes the upper area of the wind deflecting material to be even more stiff to withstand forces that are applied to the wind deflector assembly.

According to another aspect of the invention, the folded part of the wind deflecting material along the front of the roof opening extends with the first outer end part in a forward direction with respect to the longitudinal direction of vehicle. The upper area of the flexible wind deflecting material further is supported by a centrally positioned wall in the elongate part referred to as the second wall of the upper elongate element in a substantial horizontal direction. This orientation of the lip is beneficial with regard to the direction of the wind load which pulls the net in rearward seen in the longitudinal direction of the vehicle. In the first cavity the folded part and the upper part of the wind deflecting material are supported. The folded part is supported on a vertical edge of the protruding part and the upper part of the wind deflecting material is supported in a rearward direction by a second wall of the first cavity. This second wall is beneficial to the support of the wind deflecting material when the wind load pulls the wind deflecting material in a rearward direction.

According yet another aspect of the invention, the upper elongate element is an extrusion part having substantially a constant cross section along its length and wherein the upper elongate element comprises a first elongated part extending in a transvers direction with regard to the vehicles longitudinal direction in an area along the front of the roof opening and further comprising two second elongate parts, each of which are positioned in the respective area of the opposite lateral edges of the roof opening and extending in longitudinal direction of the vehicle and whereby each of the second elongate parts are connected to the first elongate part by a substantially circularly shaped third elongated parts. The upper elongate element can be made as an extrusion part, which is one long part having a constant cross section. The extrusion part can be bend in a shape, whereby at each rear end of the two second elongate parts a separate hinge part is mounted. In this way a cost effective upper elongate element can be manufactured.

According to another aspect of the invention, the upper elongate element is an extrusion part comprising a second cavity adjacent to the first cavity, said cavities formed by a first wall, a second wall and a third wall and at the upper end of said walls, a fourth wall connected to said first, second and third wall and wherein each of the cavities is open at its lower end. The second cavity is formed such that it is suitable to receive a leaf spring in the second elongate part and wherein the leaf spring is fitted in between the second and the third wall and the fourth wall. The second wall is shorter than the first wall measured from the fourth wall in a direction parallel to the second wall.

The two adjacent cavities form a rigid profile to withstand the forces that the upper elongate element is subjected to. The first cavity is used for the engagement of the wind deflecting material and the second cavity may be used to accommodate the wind deflector leaf springs.

According to another aspect of the invention each of the cavities is limited by a shared wall being the second wall and wherein in an area along the front of the roof opening the first cavity is positioned in front of the second cavity seen in a longitudinal direction of the vehicle. Thus the wind deflector leaf springs accommodated in the second cavity are fitted inward of the wind deflecting material, such that the springs cannot be seen from the outside.

In yet another embodiment the flexible wind deflecting material extends along the first elongate part around the circularly shaped third elongate parts, along the second elongate parts towards the movable connection of the second elongate parts with the stationary part. In the lateral area of the wind deflector assembly the wind deflecting material can extend all the way towards the movable connection of the wind deflector assembly with the stationary part. In this way the spring of the wind deflector assembly is hidden behind the wind deflecting material and cannot be seen from the outside of the vehicle. Next to this advantage the lateral area of the wind deflector assembly being closed off by the wind deflecting material may also be of advantage with respect to reduction of wind noises under driving conditions of the vehicle.

In yet another embodiment the flexible wind deflecting material in the area of the second elongate part further comprises a sewing line extending in the wind deflecting material for keeping the net clear of the leaf spring when the wind deflector assembly moves to its ineffective position. When the wind deflector assembly returns from its effective position to its ineffective position, the upper elongate element moves downwardly and the wind deflecting material will change from a taut condition to a loose condition. Under dynamic vehicle conditions the loose net may interfere with the wind deflector leaf spring and thus the net may get stuck or damaged by the spring, in such case the sewing line in the wind deflecting material causes the net to fold in a predetermined way and avoids the net getting stuck or damaged by the spring.

In another embodiment the flexible wind deflecting material in the area of the second elongate part further comprises an elastic strap attached to the flexible wind deflecting material whereby the elastic strap biases the wind deflecting material in both the effective and the ineffective position of the wind deflector assembly. The strap is an alternative solution for the problem of a loose wind deflecting material as described above wherein the strap causes the net to fold in a predetermined way.

In another embodiment the protruding part comprises the upper surface and further comprises a hook shaped part behind which the first outer end part is positioned such to avoid that the folded part is moving out of the first cavity.

BRIEF DESCRIPTION OF THE DRAWING

Hereafter aspects of the invention will be elucidated while referring to the drawings.

DETAILED DESCRIPTION

Figure 1:
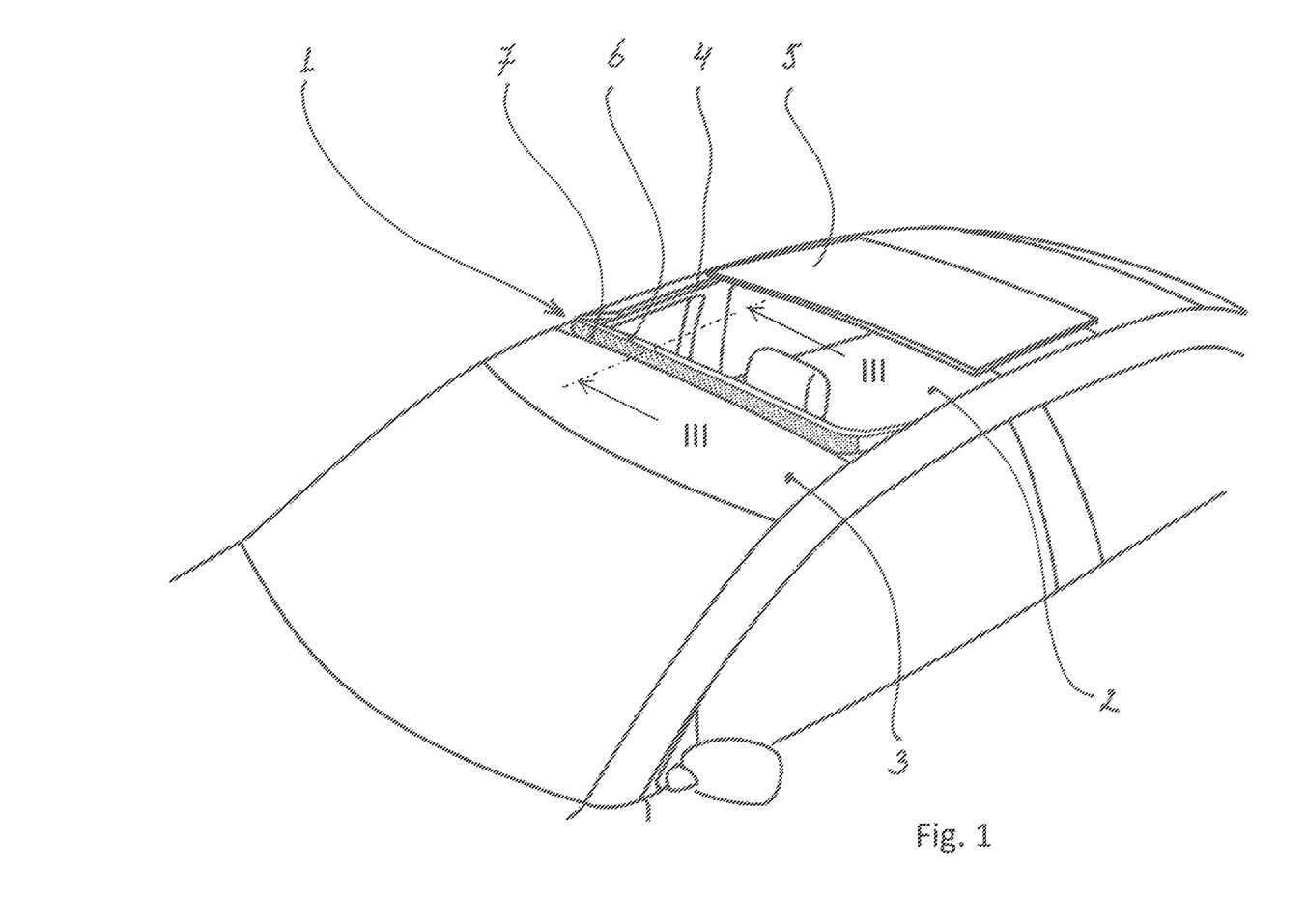
FIG. 1 illustrates a schematic view of a vehicle with an open roof construction of which a closure element is in an open position.

In FIG. 1 a general lay-out of an open roof construction is illustrated. The vehicle comprises a roof opening 2 in the fixed roof 3 of the vehicle. A wind deflector assembly 1 is positioned in the front area of the roof opening 2, seen in a longitudinal direction of the vehicle. The wind deflector assembly 1 is movably attached to a stationary part 4 and is drawn in an effective position whereby it protrudes above the surface of the fixed roof 3. In the present case the movable attachment is a hinge able attachment and the stationary part 4 is a frame part or a guide part of the open roof construction. In FIG. 1 a closure element 5 such as a panel is drawn in open position. The wind deflector assembly 1 may be used in an open roof construction of the so called top sliders or spoiler roofs but may also be used in open roof constructions such as in-slider roofs. The wind deflector assembly 1 comprises an upper elongate element 6 and a wind deflecting material 7. The upper elongate element 6 is hinge ably attached to the stationary part 4 by means of a separate plastic hinge part (shown in FIGS. 2 and 6). The wind deflecting material 7 extends between the upper elongate element 6 and the stationary part 4 and when the upper elongate element 6 is in its upper effective position the wind deflecting material 7 is in a taut condition. In such case that the closure element 5 is opened and the wind deflector assembly 1 is in the effective position and the vehicle is driving, the wind load pushes the wind deflecting material 7 a little backward and thus the tension in the net may be increased.

Figure 2:
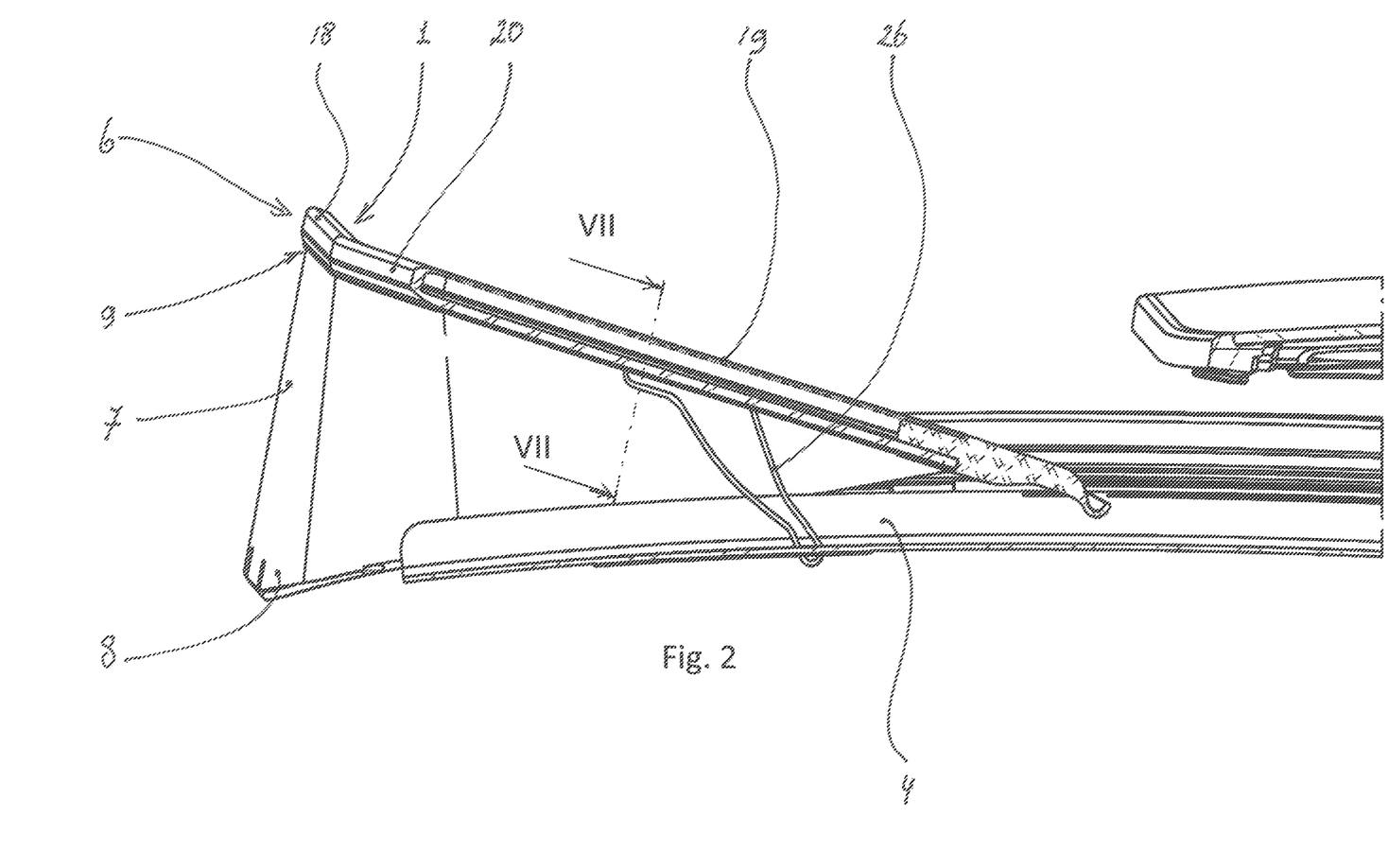
FIG. 2 illustrates a side view of the open roof construction showing the wind deflector assembly in an effective position.

In FIG. 2 the wind deflecting assembly 1 is shown in a side view. A part of the stationary part 4 is shown, showing the hinge point of the wind deflector assembly 1. The wind deflector assembly 1 further comprises a leaf spring 26 which biases the wind deflector assembly 1 to an upward direction. The leaf spring 26 is supported on the stationary part 4.

Figure 3:
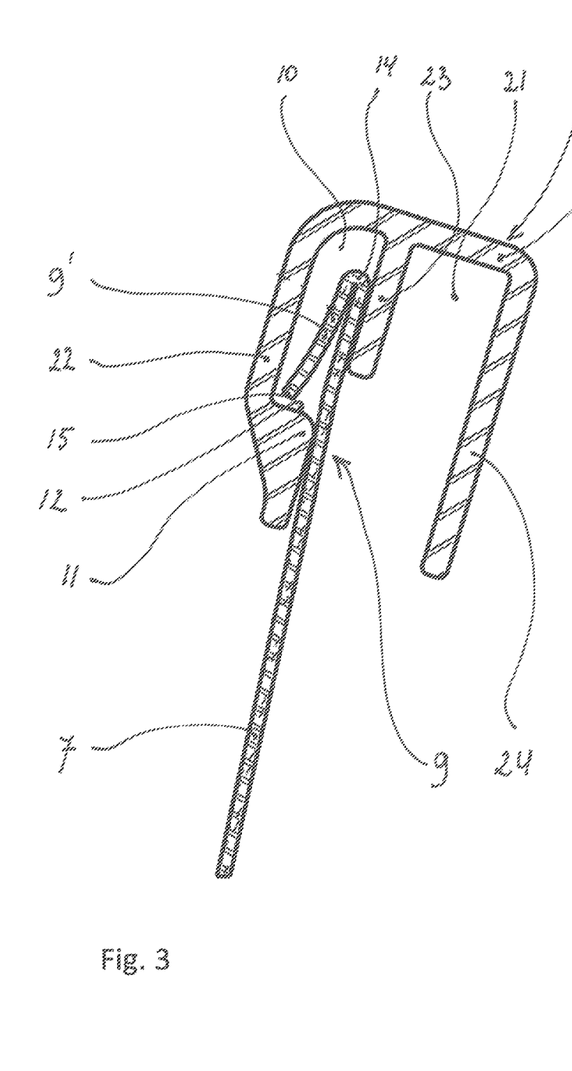
FIG. 3 illustrates a cross section along line III-III in FIG. 1 of the wind deflector assembly with the upper elongated element and the wind deflecting material.

In FIG. 3 a detail of the upper end 9 of the wind deflecting material 7 is shown and of the upper elongate element 6. The upper elongate element 6 comprises a first wall 22, a second wall 23 and a third wall 20, wherein the fourth wall 25 connects the first, second and third wall 22, 23, 24 at their respective upper ends. The upper end 9 of the wind deflecting material 7 comprises a folded part 9', which is integrally connected to the main part of the wind deflecting material 7 through a hinge part 14, and which is engaged in a first cavity 10. The folded part 9' comprises a first outer end part 15 which is pushed against the upper surface 12 of the protruding part 11 (substantially perpendicular to the folded part 9') when the wind deflecting material 7 is in a taut condition. The back of the upper end 9 is pressed against the second wall 23 supporting the upper end 9 in a rearward direction with respect to the longitudinal direction of the vehicle. Thus due to the vertical support of the folded part 9' and the substantially horizontal support of the upper end 9 of the wind deflecting material 7 the upper end 9 and the folded part stay engaged in the first cavity 10 despite the tension of that builds up in the wind deflecting material 7 between the upper and lower end 7; 8. The upper elongate element 6 comprises adjacent to the first cavity 10, a second cavity 21 in which a leaf spring 26 can be fitted (not shown in FIG. 3, however shown in FIG. 7).

Figure 4:
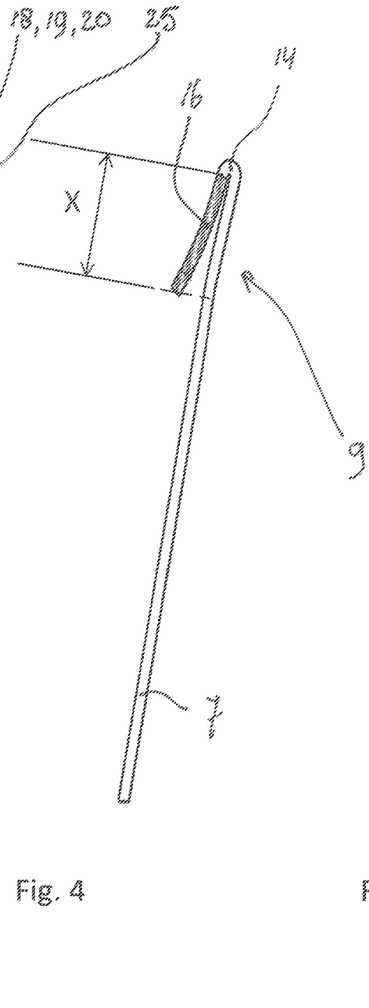
FIGS. 4 and 5 illustrate a cross section of the upper part of wind deflecting material with the folded part in two different embodiments.
Figure 5:
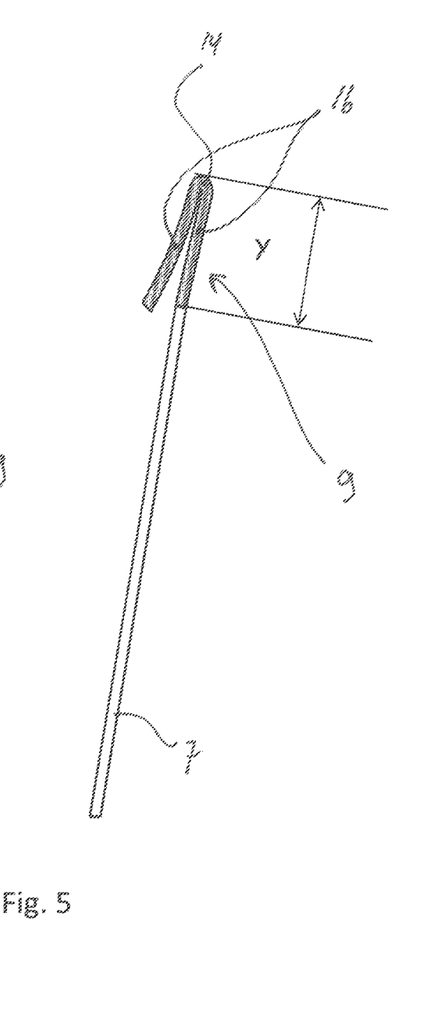

In FIGS. 4 and 5 the upper end part 9 is shown in detail, whereby in FIG. 4 the folded part 9' is reinforced with polyester material 16 over the length X. The polyester material 16 is pressed in the material of the folded part 9', i.e. the wind deflecting material 7 so as to encapsulate the yarns of the wind deflecting material 7. The length X may be in the range of 50% to 100% of the length of the folded part 16. In FIG. 5, the reinforcement with polyester material 16 extends from the first outer end part 15 of the folded art 9' via the hinge part 14 towards the upper end area 9 of the wind deflecting material 7, and extends downwardly over a length Y measured from the hinge part 14 along the wind deflector material 7 in an opposite di-rection and wherein the length Y lies in the range of 0% to 10% of the length of the folded part.

Figures 6, 7:
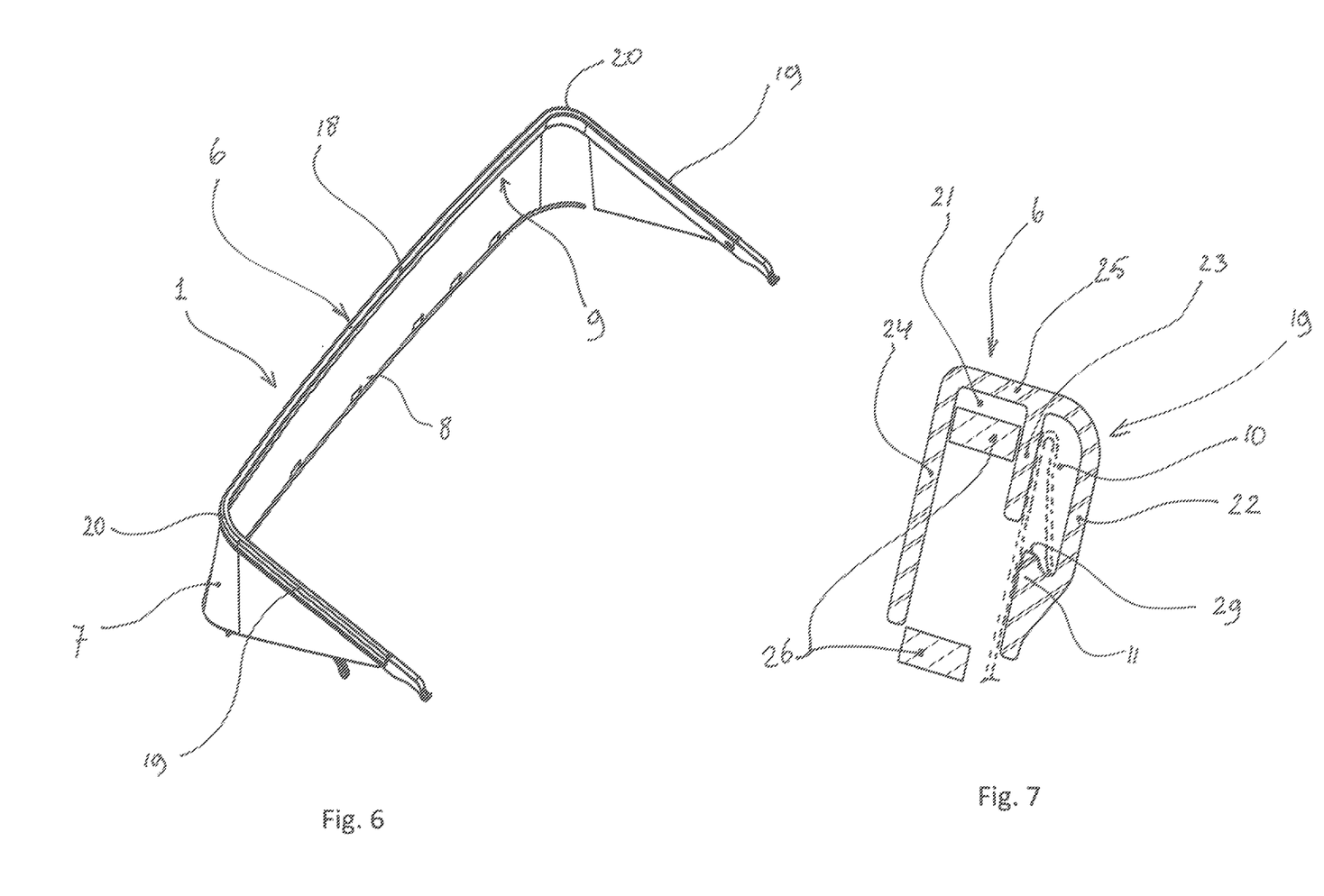
FIG. 6 illustrates in an isometric view the wind deflecting material including the upper elongate element and the wind deflecting material.
FIG. 7 illustrates a sectional view along line VII-VII in FIG. 2 with the upper elongate element and the spring.

FIG. 6 shows the wind deflector assembly 1 comprising the upper elongate element 6. The upper elongate element 6 is basically an extrusion profile comprising two cavities and which is bend in a U shape form. The U shape form allows identifying three parts of the upper elongate element 6. The first elongate part 18 extends in traverse direction of the vehicle and at it ends it merges into a third elongate part 20 shaped as a quarter part of a circle segment. The second elongate element 19 is extending from the third elongate part 20 in a rearward longitudinal direction. At the rear end of the second elongate part 19 a separate plastic hinge part is fitted.

FIG. 7 shows a section across the second elongate part 19 of the upper elongate element 6 showing the second cavity 21 in which the leaf spring 26 is fitted. Furthermore an embodiment is shown whereby a hook shaped part 29 is created on the protruding part 11 of the first cavity 10. The hooked shaped part 29 forms an additional barrier for the folded part 9' such that the folded part 9' may not move out of the cavity 10 due to the tension in the wind deflecting material 7.

Figures 8, 9:
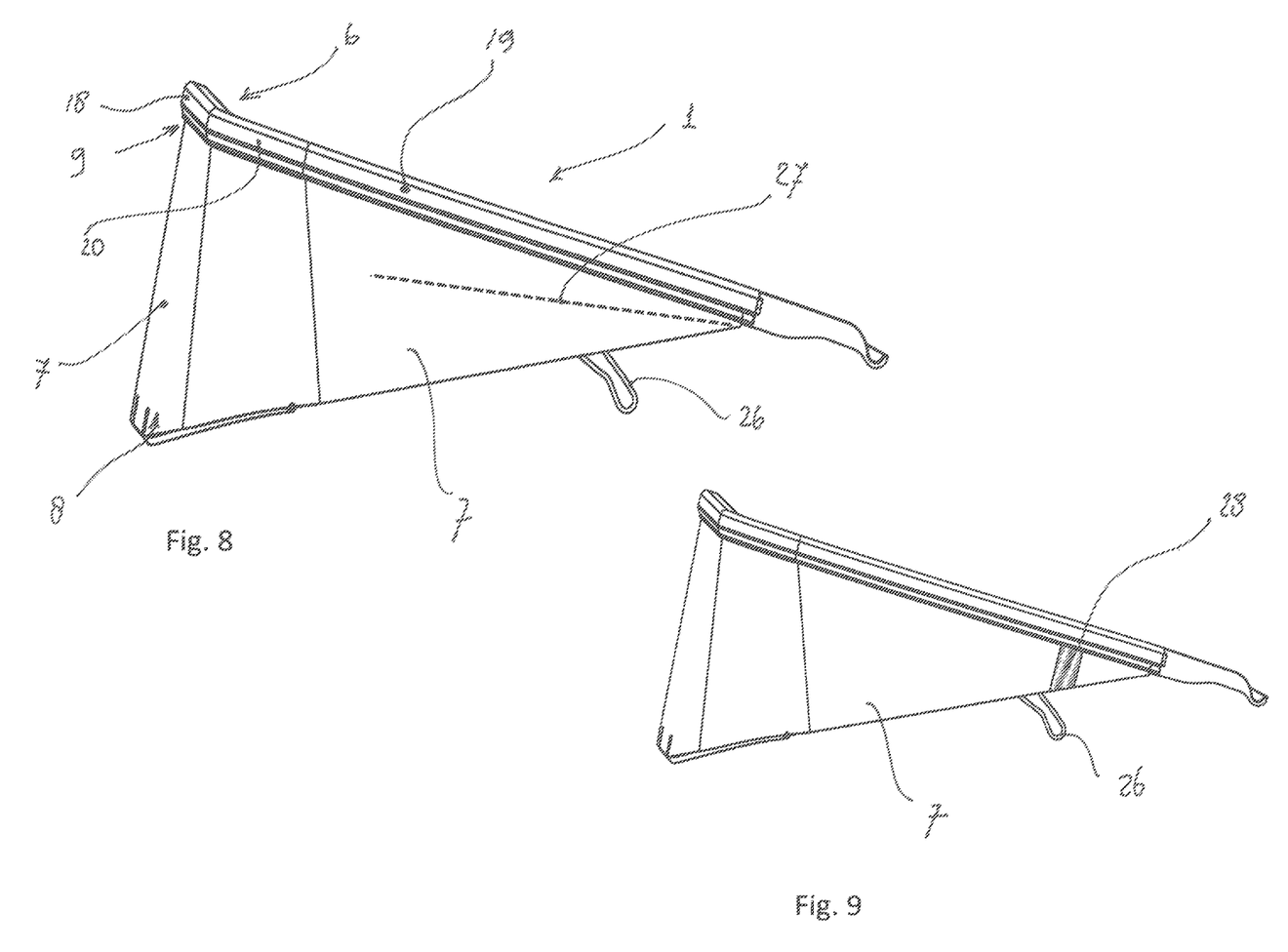
FIGS. 8 and 9 illustrate a side view of the wind deflector assembly embodiment with different embodiments.

FIGS. 8 and 9 each show a different embodiment. FIG. 8 discloses the wind deflecting material 7 extending between the second elongate part 19 and the stationary part 4 and extending in longitudinal direction to the rear end of the second elongate part 19. Further a sewing line 27 in the wind deflecting material 7 is made. The sewing line 27 may include stitching a hem in the wind deflecting material 7, or may involve stitching a separate strip to the wind deflecting material 7. The sewing line 27 may be a straight line or a curved line and may extend from the vicinity of the plastic hinge towards the front of the wind deflecting assembly. The sewing line 27 may fold the wind deflecting material 7 in a direction away from the leaf spring 26 when the upper elongate element 6 moves to an ineffective position resulting in wind deflecting material 7 that is loose and as such avoid trapping of the wind deflecting material 7 in the leaf spring 26. FIG. 9 discloses a similar embodiment, whereby an elastic strap 28 is stitched to the wind deflecting material 7. The elastic strap 28 biases the wind deflecting material 7 in a substantial vertical direction. When the wind deflecting material 7 loosens, the elastic strap 28 keeps the wind deflecting material 7 taut in its vicinity and as such avoids the material to get trapped in the leaf spring 26.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims. For example, cavity 10 could be made substantially horizontal and so that folded part 9' also extends substantially horizontal and surface 12 substantially vertical, in any event substantially perpendicularly to folded part 9' so that it is supported when wind deflecting material 7 is stretched by the wind deflector.

What is claimed is:

1. An open roof construction for a vehicle having a roof opening in a fixed roof, comprising:
    a stationary part,
    at least a closure element supported by the stationary part and configured to close the roof opening in the fixed roof and to selectively open the roof opening by being moved at least rearward,
    a wind deflector assembly positioned near at front of the roof opening, said wind deflector assembly being movable between an ineffective position below the fixed roof and an effective position projecting above the fixed roof,
    the wind deflector assembly comprising:

an upper elongate element which is movably connected to the stationary part, a flexible wind deflecting material extending at least along the front of the roof opening, attached at a lower end to the stationary part and at an upper end to the upper elongate element to keep the wind deflecting material taut in at least the effective position wherein the upper elongate element comprises at least a first cavity having an internally shaped protruding part having a surface wherein the wind deflecting material is folded at the upper end into a folded part, said folded part having a hinge part and an opposite first outer end part, wherein the folded part is mounted inside the first cavity whereby the first outer end part is being supported on the surface of the protruding part in the first cavity at least when the wind deflector assembly is in the effective position, and wherein the folded part of wind deflecting material is reinforced by polyester material applied such that the polyester material encapsulates yarns of the wind deflecting material in the part which is reinforced.

2. The open roof construction of claim 1 wherein the folded part is reinforced by polyester material over a length X of the folded part measured from the first outer end part to the hinge part wherein the length X lies in a range of 50% to 100% of the length of the folded part.

3. The open roof construction of claim 1 wherein the reinforcement with polyester material extends from the first outer end part of the folded part via the hinge part towards the upper end area of the wind deflecting material, and which extends downwardly over a length Y measured from the hinge part along the wind deflector material in an opposite direction and wherein the length Y lies in a range of 0% to 100% of the length of the folded part.

4. The open roof construction of claim 1 wherein the folded part of the wind deflecting material along the front of the roof opening extends with the first outer end part in a forward direction with respect to a longitudinal direction of the vehicle.

5. The open roof construction of claim 1 wherein the upper elongate element is an extrusion part having substantially a constant cross section along its length and wherein the upper elongate element comprises a first elongated part extending in a transverse direction with regard to a longitudinal direction of the vehicle in an area along the front of the roof opening and further comprising two second elongate parts, each of which is positioned in the respective area of the opposite lateral edges of the roof opening and extending in the longitudinal direction of the vehicle and whereby each of the second elongate parts is connected to the first elongate part by a third elongated part shaped substantially as a segment of a circle.

6. The open roof construction of claim 5 wherein the upper elongate element is an extrusion part comprising a second cavity adjacent to the first cavity, said cavities formed by a first wall, a second wall and a third wall and at an upper end of said walls, a fourth wall connected to said first, second and third wall and wherein each of the cavities is open at a lower end thereof.

7. The open roof construction of claim 6 wherein each of the cavities is limited by a shared wall being the second wall and wherein in an area along the front of the roof opening the first cavity is positioned in front of the second cavity seen in the longitudinal direction of the vehicle.

8. The open roof construction of claim 6 wherein the second cavity is formed such that the second cavity is suitable to receive a leaf spring in the second elongate part and wherein the leaf spring is fitted in between the second and the third wall and the fourth wall.

9. The open roof construction of claim 6 wherein an upper area of the flexible wind deflecting material further is supported by the second wall of the upper elongate element in a substantial horizontal direction.

10. The open roof construction of claim 6 wherein the second wall is shorter than the first wall measured from the fourth wall in a direction parallel to the second wall.

11. The open roof construction of claim 6 wherein the flexible wind deflecting material extends along the first elongate part around the third elongate parts, along the second elongate parts towards a movable connection of the second elongate parts to the stationary part.

12. The open roof construction of claim 8 wherein the flexible wind deflecting material in the area of the second elongate part further comprises a sewing line extending in the wind deflecting material for keeping the wind deflecting material clear of the leaf spring when the wind deflector assembly moves to the ineffective position.

13. The open roof construction of claim 11 wherein the flexible wind deflecting material in the area of the second elongate part further comprises an elastic strap attached to the flexible wind deflecting material whereby the elastic strap biases the wind deflecting material in both the effective and the ineffective position of the wind deflector assembly.

14. The open roof construction of claim 1 wherein the protruding part comprises the surface and further comprises a hook shaped part behind which the first outer end part is positioned such to avoid that the folded part is moving out of the first cavity.

15. A wind deflector assembly for use in an open roof construction for a vehicle having a roof opening in a fixed roof, said wind deflector assembly being configured to move between an ineffective position below the fixed roof and an effective position projecting above the fixed roof, the wind deflector assembly comprising:

an upper elongate element configured to be movably connected to a stationary part of the open roof construction, a flexible wind deflecting material configured to extend at least along a front of the roof opening, and configured to be attached at a lower end to the stationary part and at an upper end to the upper elongate element to keep the wind deflecting material taut in at least the effective position wherein the upper elongate element comprises at least a first cavity having an internally shaped protruding part having a surface, wherein the wind deflecting material is folded at the upper end in a folded part, said folded part having a hinge part and an opposite first outer end part, wherein the folded part is mounted inside the first cavity whereby the first outer end part is being supported on the surface of the protruding part in the first cavity at least when the wind deflector assembly is in the effective position, and wherein the folded part of wind deflecting material is reinforced by polyester material applied such that the polyester material encapsulates yarns of the wind deflecting material in the part which is reinforced.

16. The wind deflector assembly of claim 15 wherein the surface is an upper surface of the protruding part of in the first cavity.

17. The wind deflector assembly of claim 15 wherein the folded part is reinforced by polyester material over a length X of the folded part measured from the first outer end part to the hinge part wherein the length X lies in a range of 50% to 100% of the length of the folded part.

18. The wind deflector assembly of claim 15 wherein the reinforcement with polyester material extends from the first outer end part of the folded part via the hinge part towards the upper end area of the wind deflecting material which extends downwardly, over a length Y measured from the hinge part along the wind deflector material in an opposite direction and wherein the length Y lies in a range of 0% to 100% of the length of the folded part.

19. The wind deflector assembly of claim 16 wherein the upper elongate element is an extrusion part comprising a second cavity adjacent to the first cavity, said cavities formed by a first wall, a second wall and a third wall and at an upper end of said walls, a fourth wall connected to said first, second and third wall and wherein each of the cavities is open at a lower end thereof.

20. The wind deflector assembly of claim 7 wherein the second cavity is formed such that the second cavity is suitable to receive a leaf spring in the second elongate part and wherein the leaf spring is fitted in between the second and the third wall and the fourth wall.

* * * * *